(12) United States Patent
Koganezawa et al.

(10) Patent No.: US 7,690,830 B2
(45) Date of Patent: Apr. 6, 2010

(54) FLAT LIGHTING DEVICE AND LIQUID CRYSTAL DISPLAY DEVICE

(75) Inventors: Nobuyuki Koganezawa, Chiba (JP); Akiyoshi Tobe, Mobara (JP); Fumiyuki Sato, Kamogawa (JP)

(73) Assignees: Hitachi Displays, Ltd. (JP); Hitachi Display Devices, Ltd. (JP)

( * ) Notice: Subject to any disclaimer, the term of this patent is extended or adjusted under 35 U.S.C. 154(b) by 0 days.

(21) Appl. No.: 11/692,997

(22) Filed: Mar. 29, 2007

(65) Prior Publication Data

US 2007/0230214 A1 Oct. 4, 2007

(30) Foreign Application Priority Data

Apr. 3, 2006 (JP) .............................. 2006-101903

(51) Int. Cl.
*F21V 7/04* (2006.01)

(52) U.S. Cl. ..................... 362/615; 362/626; 362/625; 362/623; 349/65

(58) Field of Classification Search ......... 362/606–608, 362/619–620, 615, 609, 610, 612, 613, 621, 362/625, 626, 330, 331, 332, 339, 559–560; 349/65

See application file for complete search history.

(56) References Cited

U.S. PATENT DOCUMENTS

| | | | |
|---|---|---|---|
| 6,582,095 B1* | 6/2003 | Toyoda | 362/235 |
| 6,669,350 B2* | 12/2003 | Yamashita et al. | 362/612 |
| 2004/0114346 A1* | 6/2004 | Parker et al. | 362/31 |
| 2004/0130879 A1* | 7/2004 | Choi et al. | 362/31 |
| 2005/0281052 A1* | 12/2005 | Teng et al. | 362/615 |
| 2006/0044834 A1* | 3/2006 | Yu | 362/620 |

FOREIGN PATENT DOCUMENTS

| | | |
|---|---|---|
| JP | 2003-149639 | 5/2003 |
| JP | 2004-006187 | 1/2004 |
| JP | 2004-199958 | 7/2004 |
| JP | 2004-200072 | 7/2004 |
| JP | 2004-227956 | 8/2004 |

* cited by examiner

*Primary Examiner*—Sandra L O'Shea
*Assistant Examiner*—Robert J May
(74) *Attorney, Agent, or Firm*—Antonelli, Terry, Stout & Kraus, LLP.

(57) ABSTRACT

The present invention makes a radiation angle of light at a portion of a light guide plate in front of an LED formed on one edge of a light guide plate and a radiation angle of light at a corner portion of the light guide plate equal to each other as much as possible. A shape of beam control elements which are arranged on a lower surface of a light guide plate is arranged concentrically about the LED.

10 Claims, 11 Drawing Sheets

FLAT LIGHTING DEVICE AND LIQUID CRYSTAL DISPLAY DEVICE

BACKGROUND OF THE INVENTION

1. Field of the Invention

The present invention relates to a flat lighting device which can enhance the uniformity of an in-plane brightness level and a liquid crystal display device which uses such a flat lighting device.

2. Background Art

In a transmissive or transflective liquid crystal display device, a flat lighting device is formed on a back surface of the liquid crystal display device in general. This type of flat lighting device is also referred to as a backlight. In the explanation made hereinafter, the explanation is made by describing the flat lighting device also as the backlight. Particularly, with respect to the liquid crystal display device which is mounted on a gaming machine, a portable digital assistant or a mobile phone, a side-edge type backlight which assembles one or a plurality of light emitting diodes (hereinafter also abbreviated as LED) to a light guide plate as a light source has been popularly used. Also an attempt has been made to illuminate an illumination surface (back surface) of the liquid crystal display panel which is arranged above the light guide plate with the brightness distribution having small irregularities by forming a beam control element on a surface (light radiation surface) of the light guide plate.

As a conventional example of the backlight which assembles the LED to the light guide plate, the following backlight is known. JP-A-2004-200072 discloses a beam control element in which concave shapes or convex shapes (crest/grove shapes) having a triangular cross section are formed linearly. JP-A-2004-6187 discloses beam control elements in which concave shapes or convex shapes having an arcuate cross section are formed linearly. JP-A-2004-227956 discloses a beam control element in which concave shapes or convex shapes having a polygonal cross section are linearly formed. JP-A-2003-149639 discloses a beam control element in which embossed shapes having a semicircular, a semispherical or triangular-pyramidal cross section are linearly formed. JP-A-2004-199958 discloses dotted beam control elements which are formed by dot printing.

Further, there has been also proposed a backlight in which beam control elements in which concave shapes or convex shapes having a triangular, arcuate or polygonal cross section are formed on the whole surface of the light guide plate concentrically or in an arcuate shape.

SUMMARY OF THE INVENTION

A drawback which is common among the backlights of a type which arranges the beam control elements mounted on the light guide plate linearly or in a dotted manner is that it is difficult for such backlights to obtain the high brightness and the high uniformity simultaneously. Particularly, in the current stream of narrowing a picture frame of the liquid crystal display device, a distance from the LED to an effective display region is narrowed and, at the same time, there exists a tendency to increase a distance between the LEDs for realizing the higher brightness of the LED and the reduction of the number of parts of the liquid crystal display device, wherein both of these situations increase a possibility that the irregularities are generated in the vicinity of the LED. Further, the drawback that the backlight of a type which forms the beam control elements concentrically or in an arcuate shape lies in that a maximum value of a product brightness can not be increased since the LED is arranged at one portion, and it is difficult to achieve an effect unless a dedicated concentric or arcuate prism seat is used.

It is a first object of the present invention to provide a backlight of high brightness using a light guide plate which can reduce in-plane irregularities by changing a pattern of beam control elements formed on the light guide plate by changing a distance from an LED on the light guide plate. Further, it is a second object of the present invention to provide a liquid crystal display device of high quality which uses such a backlight.

The above-mentioned first object can be achieved by forming a pattern of beam control elements on a light guide plate in a curved shape about the LED in the vicinity of an LED and by forming a linear pattern having a triangular crest-or-groove cross section which extends in parallel to one side periphery of the light guide plate in a region remote from the LED. Further, the above-mentioned first object can be achieved by interposing a prism sheet which arranges a prism surface on a light radiation surface side of the light guide plate between a liquid crystal display panel and the light guide plate.

By forming the beam control element pattern on an upper surface (or a lower surface) of a light guide plate in the vicinity of an LED in a curved pattern about the LED light source and by forming the beam control element pattern on the upper surface (or the lower surface) of the light guide plate in the region remote from the LED in a linear beam control element pattern having the triangular crest-or-groove cross section which extends in parallel to one side periphery of the light guide plate, it is possible to reflect a radiation light from the LED in the specific direction by the beam control elements. As a result, it is possible to make an incident angle of light to the prism sheet arranged above the light guide plate relatively uniform angle at any portion of the light guide plate in the vicinity of the LED.

With the use of the light guide plate, the incident angle of light to the prism sheet becomes relatively uniform at any portion of the light guide plate in the vicinity of the LED and hence, the brightness above the prism sheet can be made uniform. Further, since only the region in the vicinity of the LED on the light guide plate can be formed in the curved arrangement pattern, it is possible to acquire the performance with the conventional linear prism sheet having the specification in which the entire portion of the prism sheet is formed in a linear shape. Further, even when a plurality of LED light sources is used, by forming the same number of curved patterns about the LEDs as the LEDs, it is possible to eliminate the limitation on the maximum value of the product brightness.

The backlight constitution which assembles the downward prism to the light guide plate can, compared with a conventional backlight which uses a diffusion sheet and two upward prisms which are orthogonal to each other, acquire the high brightness which increases the brightness by 30 to 50% or more in the front direction. Further, by eliminating or abolishing an optical sheet, a product cost can be reduced by the reduction of part cost and the reduction of assembling man-hours. Although a display quality is lowered due to the generation of brightness irregularities in the vicinity of a light incident portion, such lowering of quality can be suppressed by the present invention.

The present invention is preferably applicable to a miniaturized liquid crystal display device such as a liquid crystal display for a mobile phone, a liquid crystal display for a gaming machine or a liquid crystal display for a digital still camera. The present invention, however, is also applicable to a large-sized liquid crystal monitor, a large-sized liquid crystal TV, a middle-sized or large-sized amusement liquid crystal display, a vehicle-mounted liquid crystal display or the like.

DETAILED DESCRIPTION OF THE EMBODIMENTS

Hereinafter, the present invention is explained in detail in conjunction with drawings of embodiments.

Figure 1:
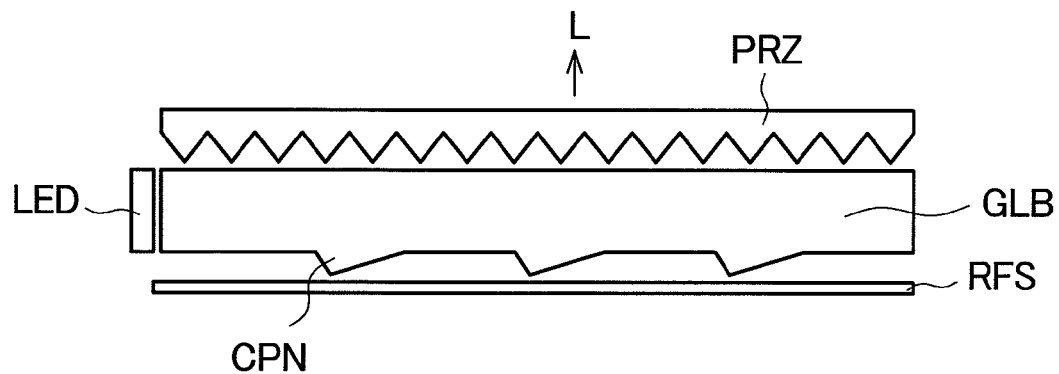
FIG. 1 is a cross-sectional view for explaining the constitution of a backlight of a liquid crystal display device.

FIG. 1 is a cross-sectional view for explaining the constitution of a backlight of a liquid crystal display device. The backlight shown in FIG. 1 is provided for explaining a result of evaluation of a front brightness acquired by beam control elements of a light guide plate which mounts a light emitting diode LED on a side periphery (edge) thereof and constitutes a simplified flat lighting device having the following constitution. That is, the beam control elements CPN are formed on a lower surface of the light guide plate GLB, an upper surface of the light guide plate GLB which faces a liquid crystal display panel in an opposed manner forms a plane, and a reflective sheet RFS is arranged below the light guide plate GLB. A prism sheet PRZ having a downward prism surface is arranged above the light guide plate GLB. Here, on a prism surface of the prism sheet PRZ, the crest/groove direction of the prism is arranged in the direction parallel to the LED mounting side edge of the light guide plate GLB. The liquid crystal display panel is illuminated with a radiation light L of the backlight.

Figure 2:
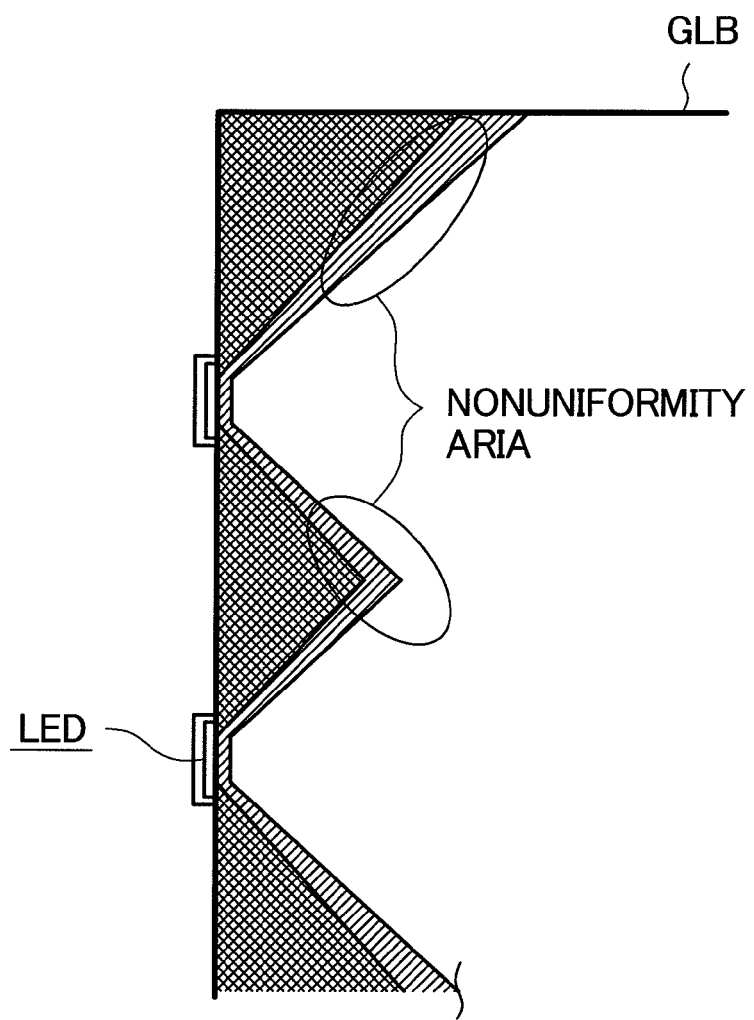
FIG. 2 is a plan view of an essential part for explaining the in-plane brightness distribution of a light guide plate GLB.

FIG. 2 is a plan view of an essential part for explaining the in-plane brightness distribution of a light guide plate GLB.

In general, the radiation (light distribution) property of the LED adopts the Lambertian distribution. A shape of a side surface (light incident surface) of a light guide plate on which light from the LED is incident is designed based on the light distribution property so as to spread the light in the inside of the light guide plate as uniform as possible. However, since the LED exhibits the property similar to the property of a spot light source and hence, there arises a region which exhibits the poor uniformity in the vicinity of the LED as shown in FIG. 2.

Figure 3:
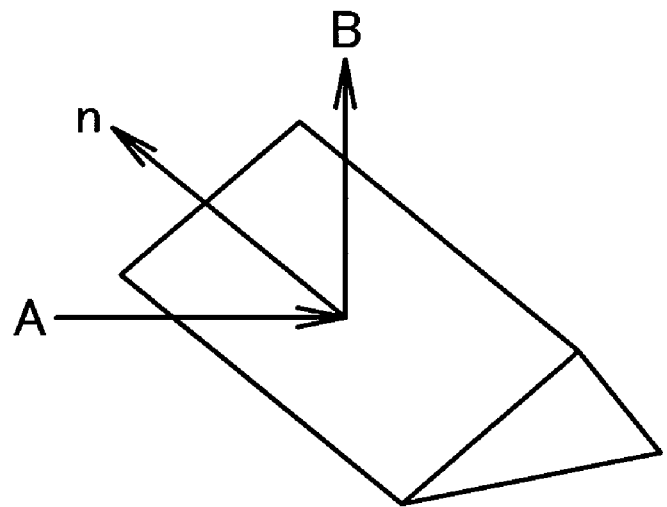
FIG. 3 is a view for explaining the behavior of light radiated from an LED.

To overcome such a drawback, the behavior of light radiated from the LED is studied. The Snell's Law which induces the direction after reflection, transmission and refraction of light is studied three-dimensionally. First of all, the reflection light is considered in conjunction with FIG. 3. FIG. 3 is a view for explaining the behavior of light radiated from the LED. In FIG. 3, a unit vector of the reflection light can be expressed by following formulae (1) (2).

$$-A \times n = n \times B \quad (1)$$

$$-A^* n = n^* B \quad (2)$$

Here,

A: unit vector of incident light

B: unit vector of reflection light n: normal-direction unit vector in plane

In the formulae, × indicates an outer product, and * indicates an inner product.

To obtain values of reflection light in the respective directions of x, y and z axes from the formulae (1) and (2), these values can be obtained by following formulae (3), (4) and (5).

$$Bx = -2nx \cdot (Ay \cdot ny + Az \cdot nz) - Ax \cdot (2nx^2 - 1) \quad (3)$$

$$By = -2ny \cdot (Az \cdot nz + Ax \cdot nx) - Ay \cdot (2ny^2 - 1) \quad (4)$$

$$Bz = -2nz \cdot (Ax \cdot nx + Ay \cdot ny) - Az \cdot (2nz^2 - 1) \quad (5)$$

Figure 4:
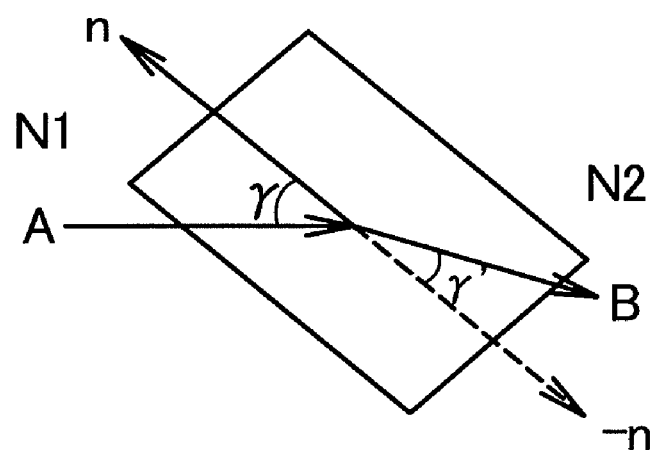
FIG. 4 is a view for explaining the relationship between a transmitted light and a refracted light.

Next, a transmitted light and a refracted light are studied in conjunction with FIG. 4.

FIG. 4 is a view for explaining the relationship between the transmitted light and the refracted light. In FIG. 4, a unit vector of the refracted light can be expressed by following formulae (6), (7), (8) and (9).

$$N_1[A \times (-n)] = N_2[B \times (-n)] \quad (6)$$

$$-A^* n = \cos \gamma \quad (7)$$

$$-B^* n = \cos \gamma' \quad (8)$$

$$N_1 \sin \gamma = N_2 \sin \gamma' \quad (9)$$

Here,

A: unit vector of incident light

B: unit vector of transmitted light and refracted light.

n: normal-direction unit vector in plane $N_1$: refractive index of a medium before transmission and refraction $N_2$: refractive index of a medium after transmission and refraction γ: angle made by A and n γ': angle made by B and −n.

To obtain γ and γ' from the formulae (7) and (9), these values can be obtained by following formulae (10) and (11).

$$\gamma = \cos^{-1}(-Ax \cdot nx - Ay \cdot ny - Az \cdot nz) \quad (10)$$

$$\gamma' = \sin^{-1}[(N1/N2)\sin\gamma] \quad (11)$$

To obtain values of transmitted light and the refracted light in respective directions of x, y and z axes from the formulae (6) and (8), the following formulae (12), (13) and (14) are used.

$$Bx = (N_1/N_2)[(1-nx^2)Ax - nx(Ay \cdot ny + Az \cdot nz)] - nx \cdot \cos\gamma' \quad (12)$$

$$By = (N_1/N_2)[(1-ny^2)Ay - ny(Az \cdot nz + Ax \cdot nx)] - ny \cdot \cos\gamma' \quad (13)$$

$$Bz = (N_1/N_2)[(1-nz^2)Az - nz(Ax \cdot nx + Ay \cdot ny)] - nz \cdot \cos\gamma' \quad (14)$$

Using these formulae, an angle of a light when the light which propagates in the inside of the light guide plate is radiated from the downward-facing prism sheet is obtained.

Figure 5A:
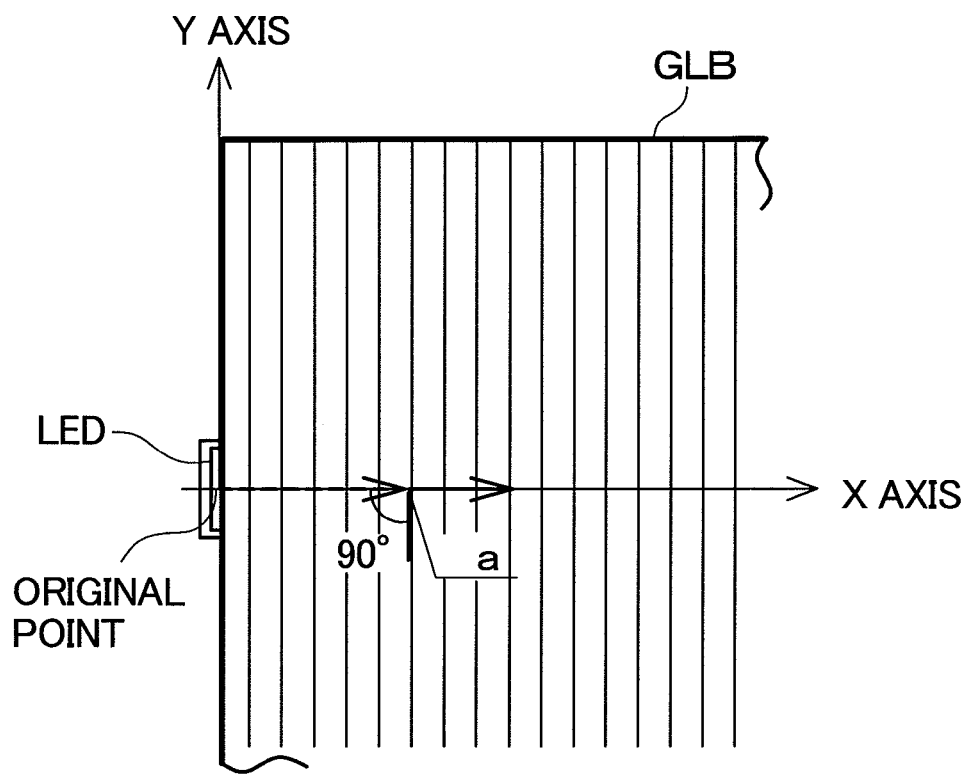
FIG. 5A and FIG. 5B are explanatory views of a simple model for explaining the calculation of a radiation angle.
Figure 5B:
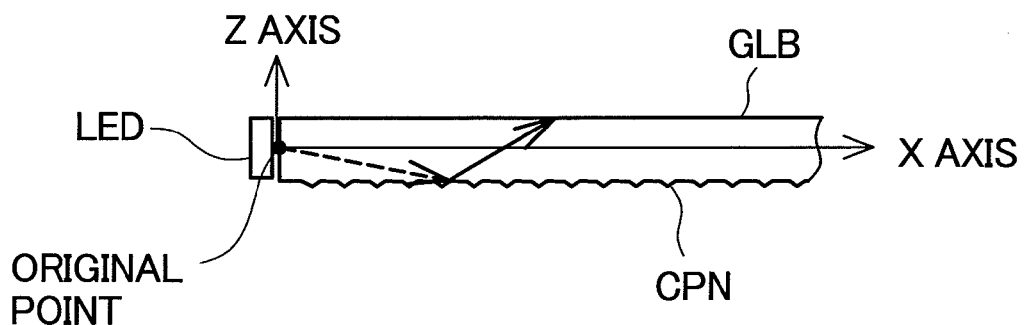
Figure 6:
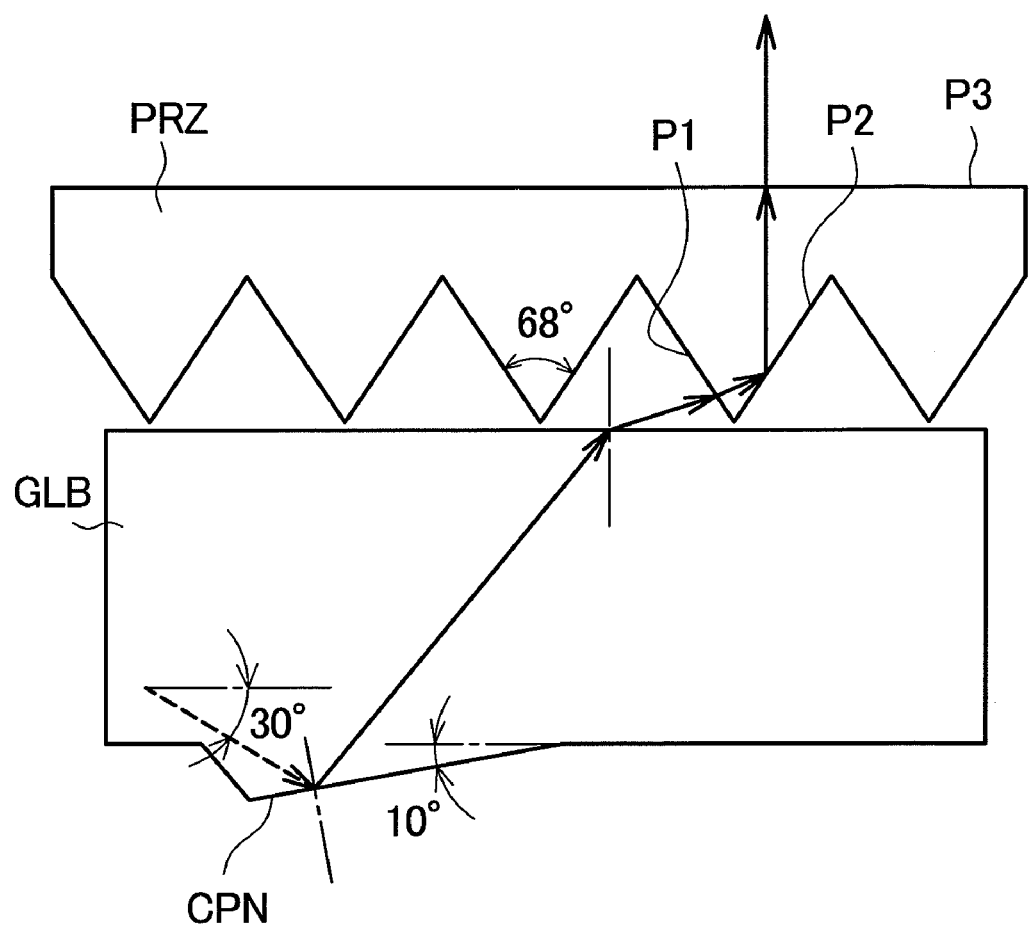
FIG. 6 is a cross-sectional view showing an essential part of the light guide plate in FIG. 5B together with a prism sheet.

FIG. 5A and FIG. 5B are explanatory views of a simple model for explaining the calculation of a radiation angle, wherein FIG. 5A is a plan view of an essential part of the light guide plate and FIG. 5B is a cross-sectional view taken along an x axis in FIG. 5A. Further, FIG. 6 is a cross-sectional view showing the essential part of the light guide plate shown in FIG. 5B together with the prism sheet. Here, the refractive index of air is set as 1.00 and the refractive indexes of the light guide plate and the downward-facing prism sheet is set as 1.49.

The unit vectors (Ax, Ay, Az) of light which is incident on a lower surface (reflection surface) of the light guide plate on which the beam control elements CPN are arranged are (0.87, 0, −0.50), and the normal direction unit vectors (nx, ny, nz) of the beam control elements CPN are (−0.17, 0, 0.98). To obtain the unit vectors (Bx, By, Bz) of the reflection light based on these values and the formulae (3), (4) and (5), the unit vectors become (0.64, 0, 0.77)

In the same manner, the unit vectors (Ax, Ay, Az) of light which is incident on an upper surface (radiation surface) of the light guide plate are (0.64, 0, 0.77), and the normal direction unit vectors (nx, ny, nz) of the upper surface of the light guide plate are (0, 0, −1). To obtain the unit vectors (Bx, By, Bz) of the light which is refracted and is radiated from the upper surface of the light guide plate based on these values and the formulae (12), (13) and (14), the unit vectors become (0.96, 0, 0.28).

The unit vectors (Ax, Ay, Az) of light which is incident on a first surface (incident surface) P1 of the downward-facing prism sheet are (0.96, 0, 0.28), and the normal direction unit vectors (nx, ny, nz) of the first surface P1 of the downward-facing prism sheet are (−0.829, 0, −0.559). To obtain the unit vectors (Bx, By, Bz) of the light which is refracted and radiated to a second surface (reflection surface) P2 from the first surface P1 of the downward-facing prism sheet based on these values and the formulae (12), (13) and (14), the unit vectors become (0.926, 0, 0.379).

The unit vectors (Ax, Ay, Az) of light which is incident on the second surface P2 of the downward-facing prism sheet are (0.926, 0, 0.379), and the normal direction unit vectors (nx, ny, nz) of the second surface P2 of the downward-facing prism sheet are (−0.829, 0, −0.559). To obtain the unit vectors (Bx, By, Bz) of the reflection light from the second surface P2 of the downward-facing prism sheet based on these values and the formulae (3), (4) and (5), the unit vectors become (0.004, 0, 1).

The unit vectors (Ax, Ay, Az) of light which is incident on a third surface (surface which faces the liquid crystal display panel: radiation surface) P3 of the downward-facing prism sheet are (0.004, 0, 1), and the normal direction unit vectors (nx, ny, nz) of the third surface P3 of the downward-facing prism sheet are (0, 0, −1). To obtain the unit vectors (Bx, By, Bz) of the light which is refracted and is radiated from the third surface P3 of the downward-facing prism sheet based on these values and the formulae (12), (13) and (14), the unit vectors become (0.006, 0, 1).

As a result, the unit vector Bz in the z-axis direction of the light radiated from the third surface P3 of the downward-facing prism sheet becomes 1 and hence, the light is radiated in the direction substantially right above the downward-facing prism sheet.

Figure 7A:
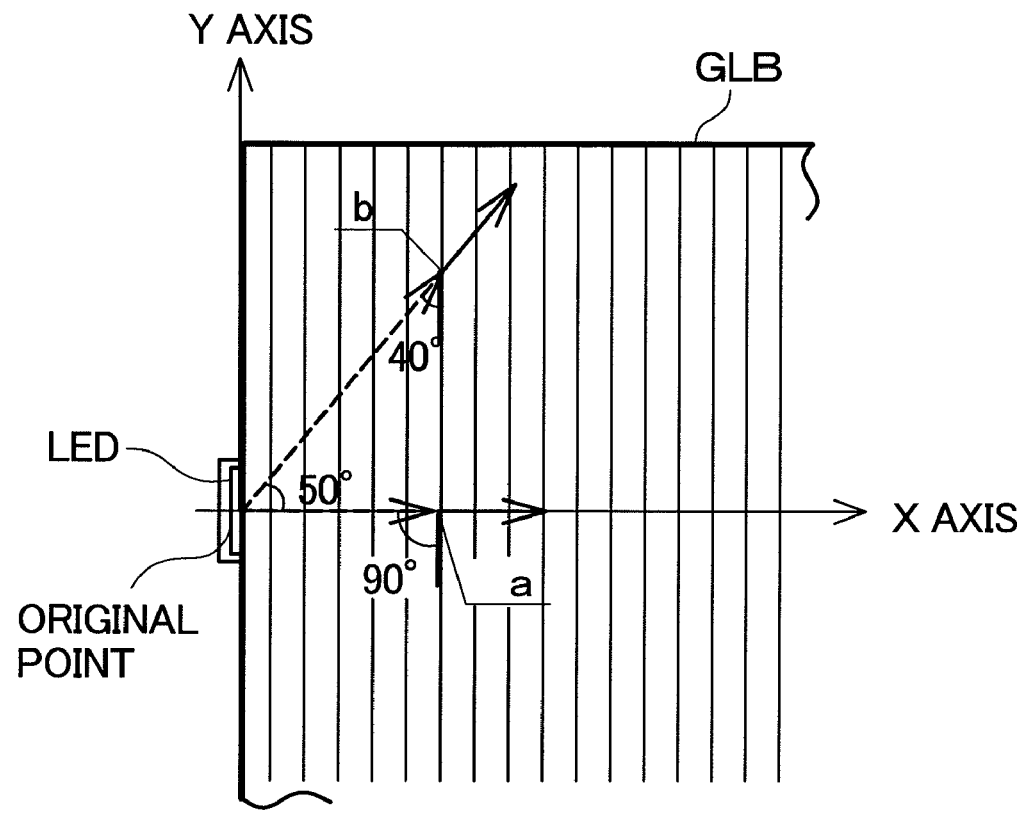
FIG. 7A and FIG. 7B are explanatory views of a calculation position on the simple model shown in FIG. 5 by the calculation method explained in conjunction with FIG. 5 and FIG. 6.
Figure 7B:
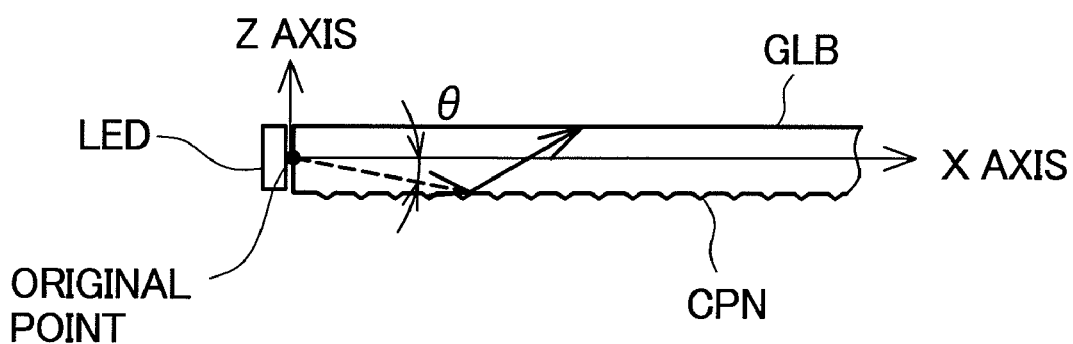

FIG. 7A and FIG. 7B are explanatory views of the calculation position on the simple model shown in FIG. 5 by the calculation method explained in conjunction with FIG. 5 and FIG. 6. The beam unit vectors at a point "a" and a point "b" in FIG. 7 are calculated provisionally using an angle made by the light which is incident on the lower surface which form the beam control elements thereon and an X-Y plane as a parameter. Table 1 shows the calculation result with respect to the point "a" and Table 2 shows the calculation result with respect to the point "b".

TABLE 1

| | Beam unit vector when light is incident on beam control element | | | Beam unit vector when light is radiated from downward-facing prism sheet | | |
|---|---|---|---|---|---|---|
| | Ax | Ay | Az | Bx | By | Bz |
| θ = 25° | 0.906 | 0.000 | −0.423 | no radiation | no radiation | no radiation |
| θ = 30° | 0.866 | 0.000 | −0.500 | 0.006 | 0.000 | 1.000 |
| θ = 35° | 0.819 | 0.000 | −0.574 | 0.260 | 0.000 | 0.966 |
| θ = 40° | 0.766 | 0.000 | −0.643 | 0.440 | 0.000 | 0.898 |
| θ = 45° | 0.707 | 0.000 | −0.707 | 0.588 | 0.000 | 0.809 |
| θ = 50° | 0.643 | 0.000 | −0.766 | 0.715 | 0.000 | 0.699 |
| θ = 55° | 0.574 | 0.000 | −0.819 | 0.825 | 0.000 | 0.565 |
| θ = 60° | 0.500 | 0.000 | −0.866 | 0.920 | 0.000 | 0.391 |
| θ = 65° | 0.423 | 0.000 | −0.906 | no radiation | no radiation | no radiation |

TABLE 2

| | Beam unit vector when light is incident on beam control element | | | Beam unit vector when light is radiated from downward-facing prism sheet downward-facing prism sheet | | |
|---|---|---|---|---|---|---|
| | Ax | Ay | Az | Bx | By | Bz |
| θ = 25° | 0.583 | 0.694 | −0.423 | no radiation | no radiation | no radiation |
| θ = 30° | 0.557 | 0.663 | −0.500 | no radiation | no radiation | no radiation |
| θ = 35° | 0.527 | 0.628 | −0.574 | no radiation | no radiation | no radiation |
| θ = 40° | 0.492 | 0.587 | −0.643 | 0.310 | 0.876 | 0.369 |
| θ = 45° | 0.455 | 0.542 | −0.707 | 0.524 | 0.809 | 0.267 |
| θ = 50° | 0.413 | 0.492 | −0.766 | no radiation | no radiation | no radiation |
| θ = 55° | 0.369 | 0.439 | −0.819 | no radiation | no radiation | no radiation |
| θ = 60° | 0.321 | 0.383 | −0.866 | no radiation | no radiation | no radiation |
| θ = 65° | 0.272 | 0.324 | −0.906 | no radiation | no radiation | no radiation |

From these results, it is understood that the radiation quantity of the light from the point "b" is smaller than the radiation quantity of the light from the point "a" and hence, the radiation angle which contributes to the front brightness is also small. Accordingly, the brightness distribution in the inside of the light guide plate exhibits the non-uniform distribution in which the brightness is high at the LED front portion and low at the corner portion of the LED.

Figure 8A:
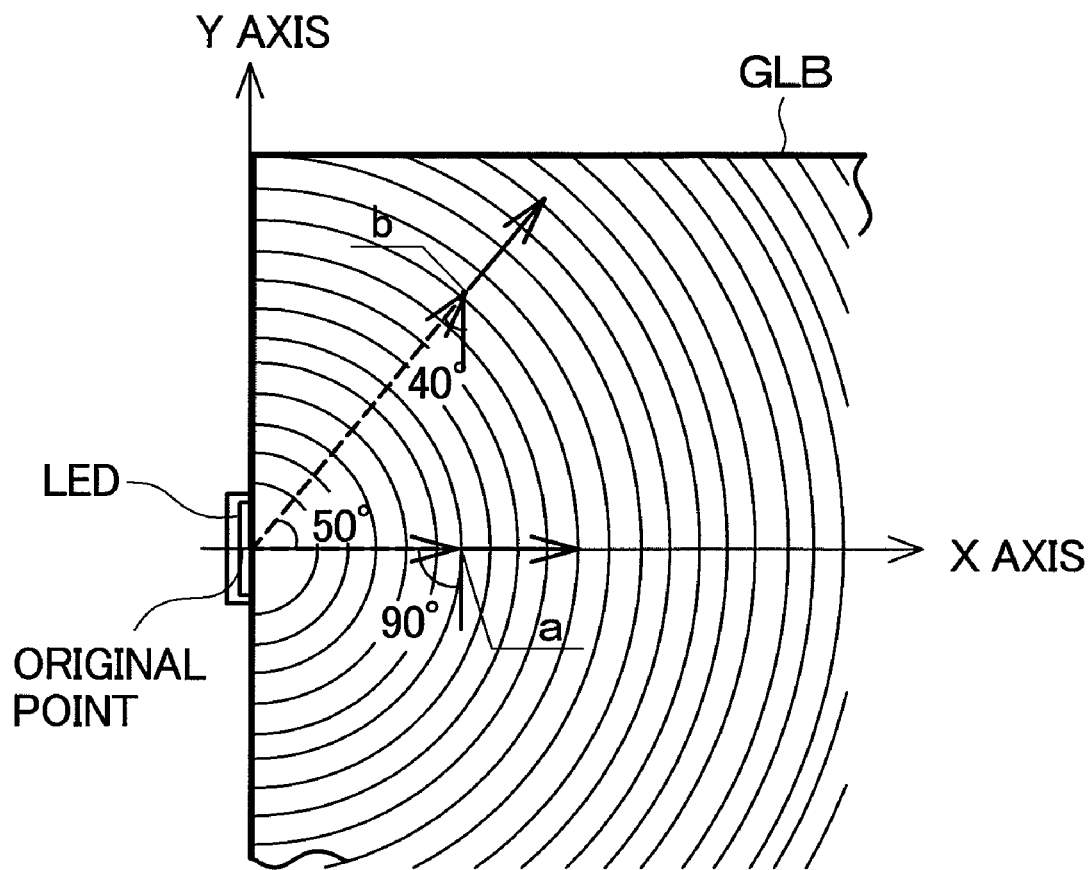
FIG. 8A and FIG. 8B are explanatory view of a simple model for explaining an embodiment 1 of the present invention.
Figure 8B:
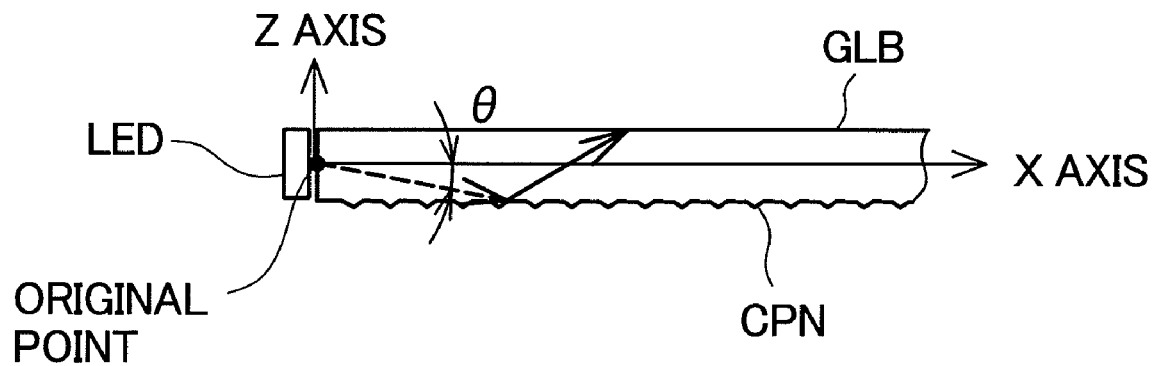

FIG. 8A and FIG. 8B are explanatory views of a simplified model for explaining the embodiment of the present invention, wherein FIG. 8A is a plan view of an essential part of the light guide plate and FIG. 8B is a cross-sectional view thereof taken along an x-axis in FIG. 8A. The embodiment 1 overcomes the non-uniform brightness distribution in the inside of the light guide plate attributed to the high brightness on the front surface of the LED and the low brightness on the corner portion of the LED. The technique of the embodiment 1 is based on a technical concept that a radiation angle of light from the front surface of LED and the radiation angle of light from the corner portion of the LED are made equal to each other as much as possible by changing a shape of a beam control elements CPN arranged on a lower surface of the light guide plate GLB. As a specific shape of the beam control elements CPN, the beam control elements CPN may be configured to allow any portions of the beam control elements CPN to have a constant shape as viewed from the light irradiated from the LED such that the incident angle of light radiated from the LED becomes constant even when the light is incident on any portion of the beam control elements CPN. In FIG. 8, the beam control elements CPN are arranged concentrically about the LED. A result obtained by calculating the beam radiation angle of the light from the downward-facing prism sheet on the point "a" and the point "b" in such an arrangement pattern is shown in Table 3 and Table 4. Table 3 shows the calculation result with respect to the point "a" and Table 4 shows the calculation result with respect to the point "b".

TABLE 3

| | Beam unit vector when light is incident on beam control element | | | Beam unit vector when light is radiated from downward-facing prism sheet downward-facing prism sheet | | |
|---|---|---|---|---|---|---|
| | Ax | Ay | Az | Bx | By | Bz |
| θ = 25° | 0.906 | 0.000 | −0.423 | no radiation | no radiation | no radiation |
| θ = 30° | 0.866 | 0.000 | −0.500 | 0.006 | 0.000 | 1.000 |
| θ = 35° | 0.819 | 0.000 | −0.574 | 0.260 | 0.000 | 0.966 |
| θ = 40° | 0.766 | 0.000 | −0.643 | 0.440 | 0.000 | 0.898 |
| θ = 45° | 0.707 | 0.000 | −0.707 | 0.588 | 0.000 | 0.809 |
| θ = 50° | 0.643 | 0.000 | −0.766 | 0.715 | 0.000 | 0.699 |
| θ = 55° | 0.574 | 0.000 | −0.819 | 0.825 | 0.000 | 0.565 |
| θ = 60° | 0.500 | 0.000 | −0.866 | 0.920 | 0.000 | 0.391 |
| θ = 65° | 0.423 | 0.000 | −0.906 | no irradiation | no irradiation | no irradiation |

TABLE 4

| | Beam unit vector when light is incident on beam control element | | | Beam unit vector when light is radiated from downward-facing prism sheet downward-facing prism sheet | | |
|---|---|---|---|---|---|---|
| | Ax | Ay | Az | Bx | By | Bz |
| θ = 25° | 0.583 | 0.694 | −0.423 | no radiation | no radiation | no radiation |
| θ = 30° | 0.557 | 0.663 | −0.500 | 0.159 | 0.735 | 0.659 |
| θ = 35° | 0.527 | 0.628 | −0.574 | 0.395 | 0.656 | 0.643 |
| θ = 40° | 0.492 | 0.587 | −0.643 | 0.558 | 0.572 | 0.602 |
| θ = 45° | 0.455 | 0.542 | −0.707 | 0.688 | 0.483 | 0.541 |
| θ = 50° | 0.413 | 0.492 | −0.766 | 0.796 | 0.391 | 0.461 |
| θ = 55° | 0.369 | 0.439 | −0.819 | 0.887 | 0.296 | 0.354 |
| θ = 60° | 0.321 | 0.383 | −0.866 | 0.962 | 0.199 | 0.186 |
| θ = 65° | 0.272 | 0.324 | −0.906 | no radiation | no radiation | no radiation |

Figure 9A:
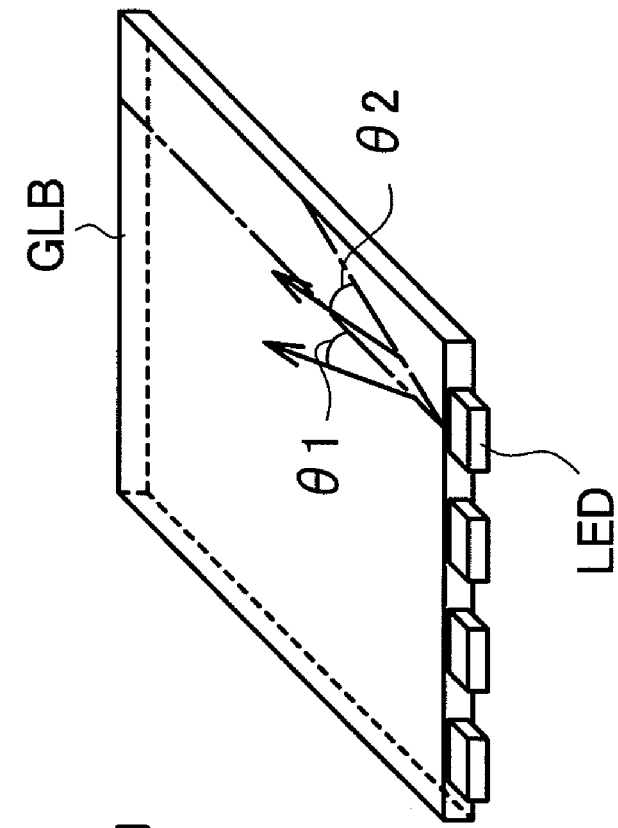
FIG. 9A and FIG. 9B are views for explaining a light guide plate of an embodiment 2 of the present invention.
Figure 9B:
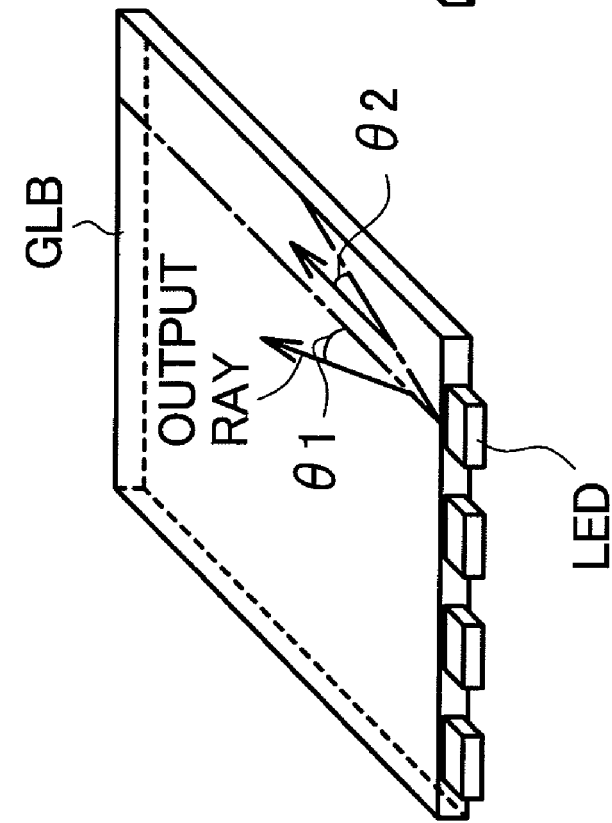

FIG. 9A and FIG. 9B are views for explaining an embodiment of the present invention on the light guide plate, wherein FIG. 9A shows a case in which the beam control elements CPN exhibit an arrangement pattern in a linear shape on the whole surface of the light guide plate (θ1≠θ2), and FIG. 9B shows a case in which the beam control elements CPN exhibit an arrangement pattern in a curved shape in the vicinity of the LED (θ1≈θ2).

In FIG. 9A and FIG. 9B, the note θ1 means the angle of between an upper surface (radiation surface) of the light guide plate GLB and the light radiated from the point "a", and the note θ2 means the angle of between an upper surface (radiation surface) of the light guide plate GLB and the light radiated from the point "b".

The angle of the radiating light θ1 and θ2 are closed to each other, hence the radiating light form the downward-facing sheet PRZ is uniformly.

It is needless to say that besides the constitution shown in FIG. 8, the beam control elements which are arranged in a curved pattern such as an elliptical pattern or a parabolic pattern can achieve the brightness uniformity enhancing effect. Due to the above-mentioned results, as shown in FIG. 9A and FIG. 9B, the arrangement of the beam control elements in a curved shape can decrease the difference in angle of the light at respective points at which the light is radiated from the light guide plate compared to the linear arrangement of the beam control elements. Accordingly, it is understood that with the curved arrangement of the beam control elements, the brightness distribution on the illumination surface becomes uniform.

Figure 10:
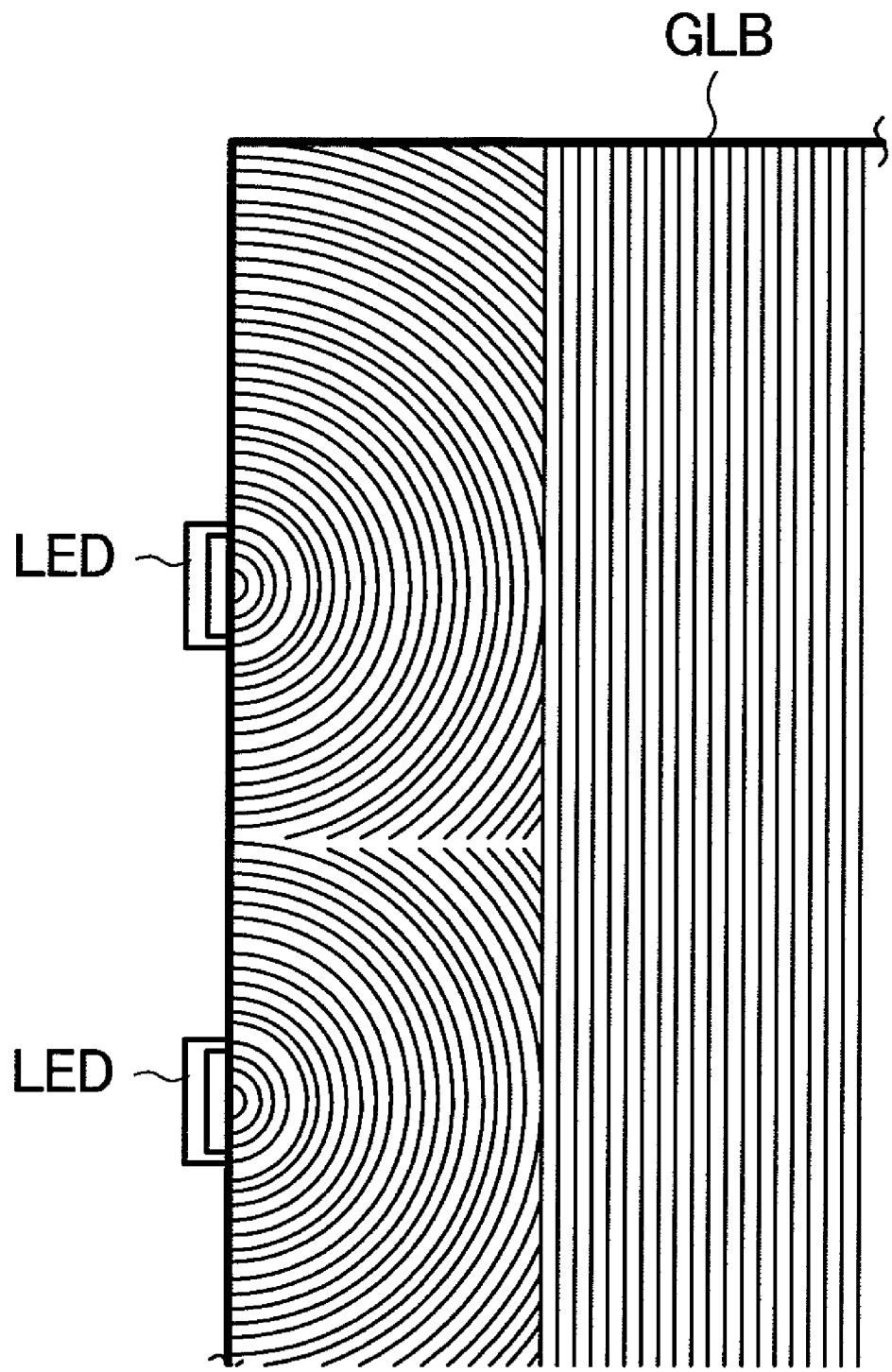
FIG. 10 is a view showing the constitution in which beam control elements in the vicinity of the LED are arranged concentrically and the beam control elements remote from the LED are arranged linearly.
Figure 11:
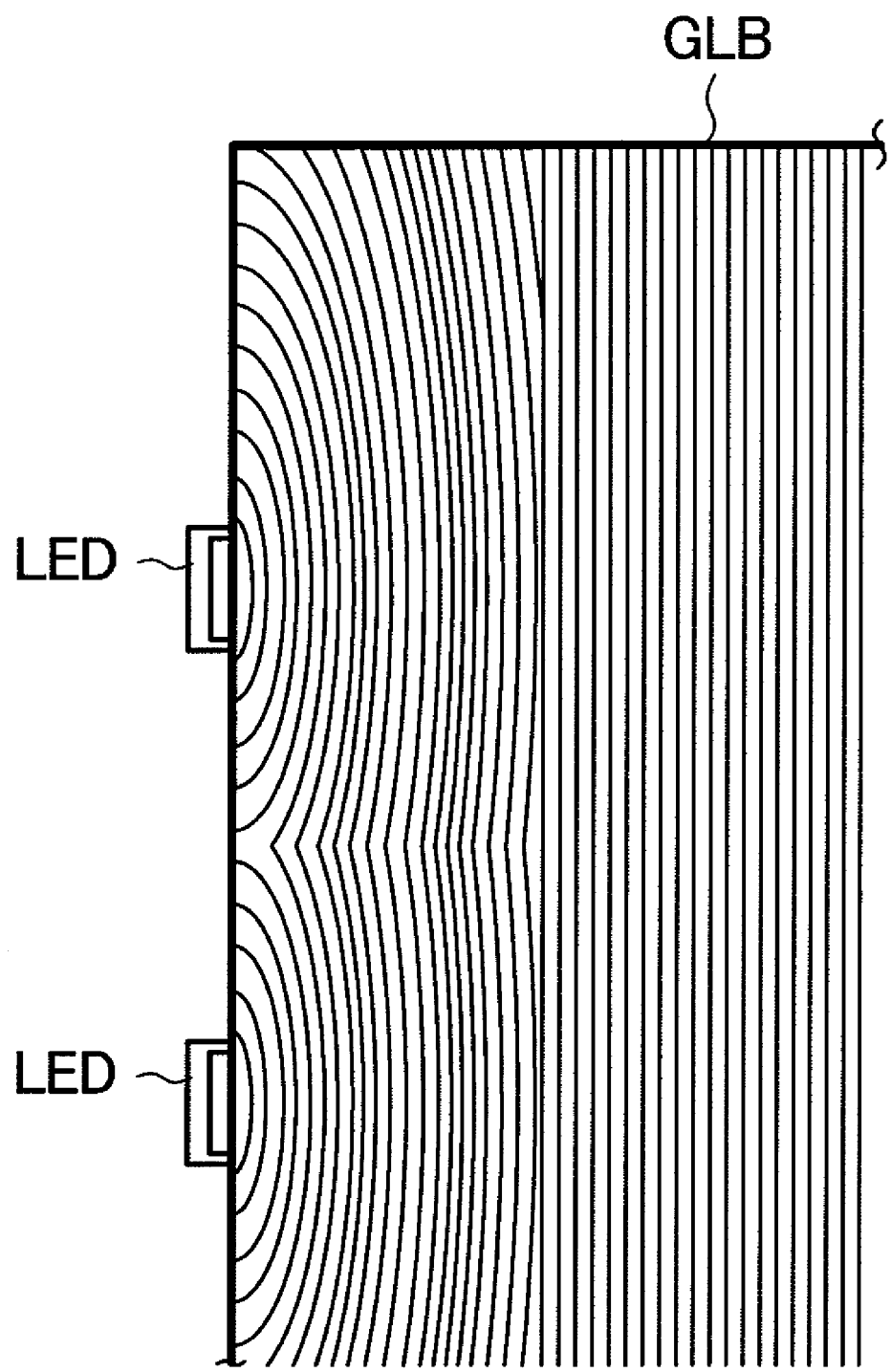
FIG. 11 is a view showing the constitution in which beam control elements in the vicinity of the LED are arranged in an elliptical shape and the beam control elements remote from the LED are arranged linearly.

The present invention aims at the enhancement of the uniformity of brightness in the vicinity of the LED and hence, it may be sufficient to arrange the beam control elements having the above-mentioned curved pattern only in the vicinity of the LED. Further, the present invention provides the constitution which can cope with mounting of the large number of LEDs. In an embodiment 3, the arrangement pattern of beam control elements differs between the portion in the vicinity of the LED and a portion remote from the LED. Specific examples are shown in FIG. 10 and FIG. 11. FIG. 10 show the constitution in which the beam control elements are concentrically arranged in the vicinity of the LED and the beam control elements are arranged linearly in the portion away from the LED. Further, FIG. 11 shows the constitution in which the beam control elements are arranged in an elliptical shape in the vicinity of the LED and are arranged linearly at a portion remote from the LED.

Figure 12:
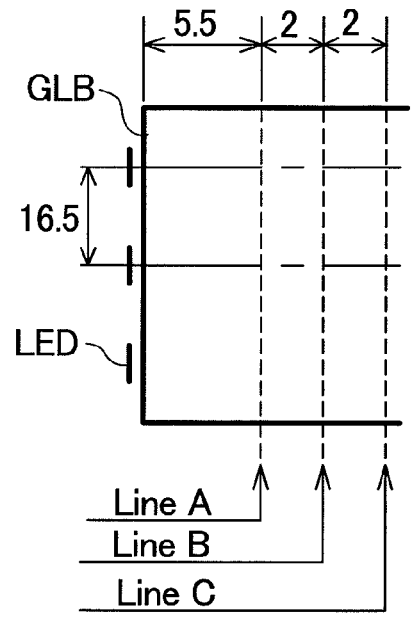
FIG. 12 is a view for explaining an evaluation method for evaluating the average brightness and the brightness irregularities on a prototype actually.

FIG. 12 is a view for explaining an evaluation method for evaluating the average brightness and the brightness irregularities on a prototype actually. In FIG. 12, the brightness uniformities at respective lines (Line A, Line B, Line C)

which are spaced apart from an LED-side light-guide-plate end surface of the backlight which mounts three LEDs thereon at a pitch of 16.5 mm by 5.5 mm, 7.5 mm, 9.5 mm and the average brightness of the whole surface of the backlight are used as indexes. The brightness uniformity is defined by the following formula (15).

$$\text{brightness uniformity} = (\text{maximum brightness} - \text{minimum brightness})/\text{average brightness} \qquad (15)$$

Figure 13A:
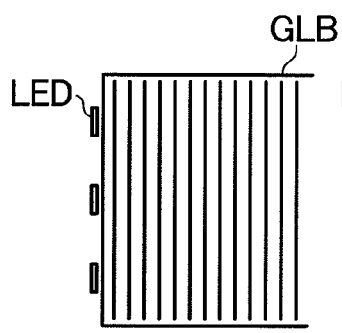
FIG. 13 is an explanatory view of an existing light guide plate on which beam control elements are formed and a plurality of types of the light guide plate.
Figure 13B:
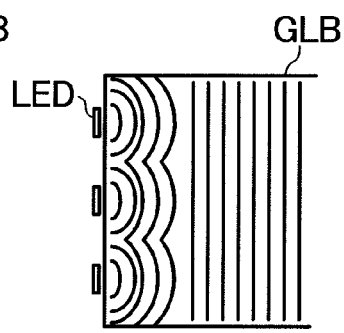
Figure 13C:
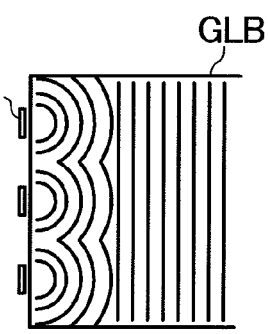
Figure 13D:
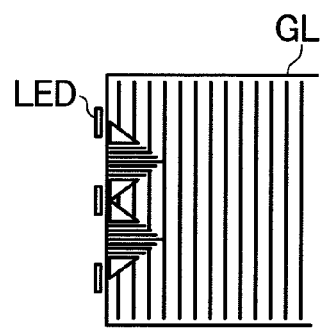
Figure 13E:
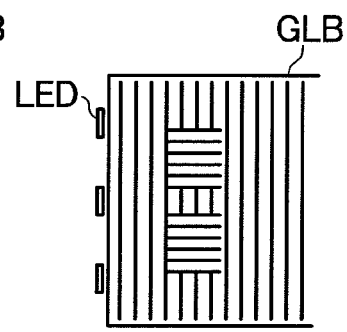

FIG. 13A to FIG. 13E are explanatory views showing an existing light guide plate on which beam control elements are mounted, and a plurality of types of the light guide plates. FIG. 13A shows the type of the existing product, and type No. 1 to No. 4 indicate the light guide plates, wherein the type No. 1 adopts a partially elliptical pattern, the type No. 2 adopts a partially arcuate pattern, the type No. 3 and No. 4 adopt a partially laterally arranged groove pattern. The average brightness and the brightness uniformity of the light guide plates of the present invention are described in Table 5 in comparison with the average brightness and the brightness uniformity of the existing product. As can be understood from a result shown in Table 5, the larger the average brightness than 100%, the light guide plate of the present invention exhibits more favorable property than the existing product, while the smaller the brightness uniformity than 100%, the property of the light guide plate of the present invention is improved than the property of the existing product.

TABLE 5

| type | average brightness | Line A | Line B | Line C |
|---|---|---|---|---|
| present article | 100% | 100% | 100% | 100% |
| type No. 1 | 100% | 83% | 86% | 73% |
| type No. 2 | 100% | 90% | 97% | 73% |
| type No. 3 | 103% | 85% | 72% | 98% |
| type No. 4 | 102% | 101% | 69% | 76% |

Due to such a result, it is understood that with respect to the partially elliptical pattern and the partially arcuate patter, the brightness uniformity can be enhanced without changing the average brightness. The substantially same advantageous effect is confirmed also with respect to the partially laterally directed groove pattern.

Here, by forming a pattern of the beam control elements substantially equal to the above-mentioned beam control element pattern on the light radiation surface (upper surface) of the light guide plate, it is possible to obtain the substantially equal advantageous effect.

Figure 14:
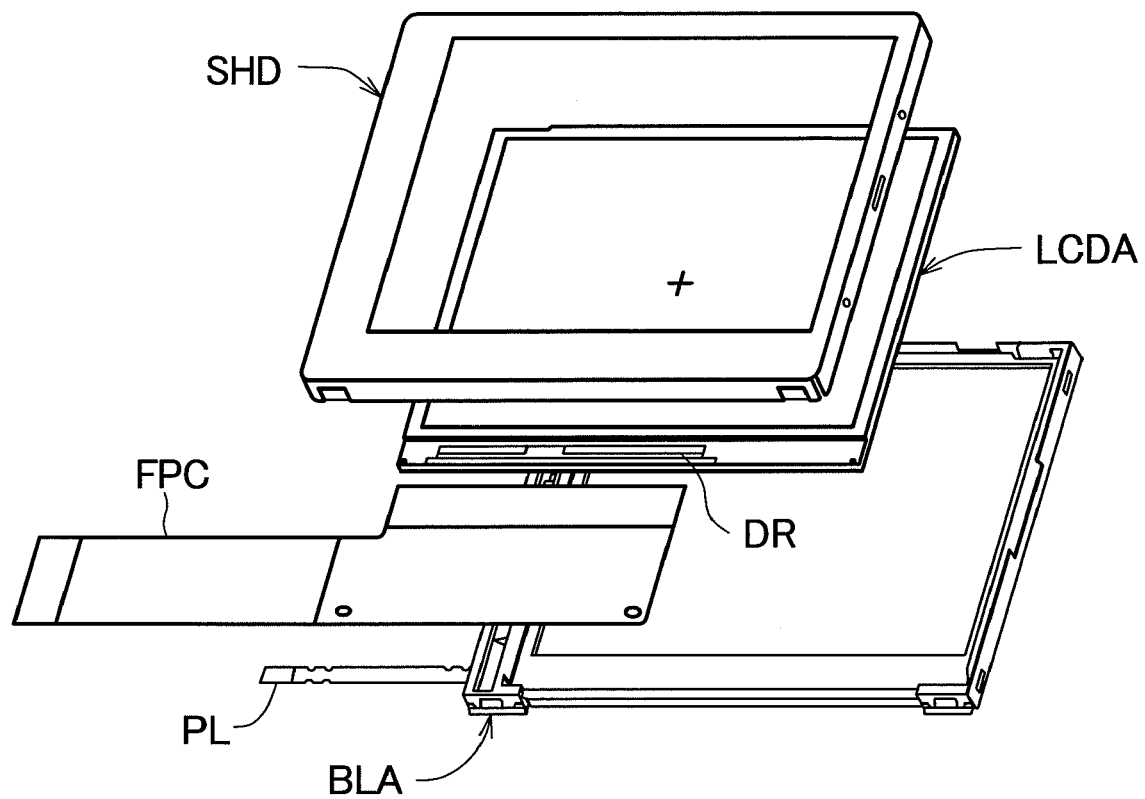
FIG. 14 is a developed perspective view for explaining the whole constitution of the liquid crystal display device according to the present invention.

FIG. 14 is a developed perspective view for explaining the whole constitution of the liquid crystal display device according to the present invention. On a back surface of a liquid crystal display panel assembly LCDA which is constituted by mounting a drive circuit DR on a liquid crystal display panel, a backlight assembly BLA which is constituted by assembling the light guide plate, and optical compensation members such as the diffusion sheet, the prism sheet and the like explained in the embodiment 1 or embodiment 2 are mounted. Any one of the beam control element patterns explained in the above-mentioned embodiments is applied to the light guide plate, and the prism sheet having the downward prism surface is mounted on the upper surface of the light guide plate. Between the liquid crystal display panel assembly LCDA and an external signal source, a signal connection member which is preferably formed of a flexible printed circuit board FPC is connected. A surface of the liquid crystal display panel assembly LCDA is covered with a frame SHD, and the frame SHD is engaged with the backlight assembly BLA thus assembling an integral liquid crystal display device. The supply of electricity to the light emitting diodes which constitutes the backlight is performed through a line PL.

What is claimed is:

1. A flat lighting device comprising:
    a light guide plate;
    a reflective plate mounted on the light guide plate, and having a downward prism surface facing an upper surface of the light guide plate;
    a plurality of light sources which are arranged on one side periphery of the light guide plate at a predetermined interval; and
    a beam control element pattern formed about each of the light sources on a lower surface of the light guide plate;
    wherein the beam control element pattern includes a curved beam control element pattern formed on the lower surface of the light guide plate about the light sources concentrically and arranged at a position in a vicinity of the light sources, and a linear beam control element pattern arranged on the lower surface of the light guide plate at a position remote from the light sources extending in parallel to the one side periphery of the light guide plate at which the light sources are arranged.

2. A flat lighting device according to claim 1, wherein the curved beam control element pattern is formed in one of an elliptical shape and a parabolic shape.

3. A flat lighting device according to claim 1, wherein the beam control element pattern-has a triangular cross section.

4. A liquid crystal display device comprising:
    a liquid crystal display panel; and
    a lighting device which is arranged on a back surface of the liquid crystal display panel;
    wherein the lighting device includes:
        a light guide plate;
        a plurality of light sources arranged on one side periphery of the light guide plate at a predetermined interval; and
        a plurality of beam control element patterns formed on a lower surface of the light guide plate that includes a plurality of curved beam control element patterns and a plurality of linear beam control element patterns that are arranged so that each of the plurality of light sources is associated with one curved beam control element pattern and one linear beam control element pattern,
        wherein the curved beam control element pattern is formed continuously on the lower surface of the light guide plate about the corresponding light source concentrically and arranged at a position in a vicinity of the light source, and
        wherein the linear beam control element pattern is formed on the lower surface of the light guide plate at a position remote from the corresponding light source extending in parallel to the one side periphery of the light guide plate at which the plurality of light sources are arranged.

5. A liquid crystal display device according to claim 4, wherein the curved beam control element patterns are formed in one of an elliptical shape and a parabolic shape.

6. A liquid crystal display device according to claim 4, wherein the beam control element patterns are formed by elements having a triangular cross section.

7. A flat lighting device comprising:
a light guide plate;
at least one light source arranged on a side periphery of the light guide plate;
at least one curved beam control element pattern formed on a lower surface of the light guide plate; and
at least one linear beam control element pattern; wherein the curved beam control element pattern is formed continuously on the lower surface of the light guide plate about the light source concentrically, and arranged at a position in a vicinity of the light source, and wherein the linear beam control element pattern is formed on the lower surface of the light guide plate, and arranged at a position remote from the light source and extends in parallel to the one side periphery of the light guide plate at which the light source is arranged.

8. A flat lighting device according to claim 7, wherein the curved beam control element pattern is formed in a circular shape.

9. A flat lighting device according to claim 7, wherein the curved beam control element pattern is formed in an elliptical shape.

10. A flat lighting device according to claim 7, wherein the curved beam control element pattern and the linear beam control element pattern are formed by elements having a triangular cross section.

* * * * *